United States Patent
Kosaka (10) Patent No.: US 9,036,207 B2
(45) Date of Patent: May 19, 2015

(54) IMAGE-FORMING APPARATUS ADJUSTING IMAGE-FORMING OPERATION USING VALUES ACQUIRED FROM DIFFERENT MEASUREMENT ENVIRONMENTS

(71) Applicant: Brother Kogyo Kabushiki Kaisha, Nagoya-shi, Aichi-ken (JP)

(72) Inventor: Raizo Kosaka, Konan (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/284,844

(22) Filed: May 22, 2014

(65) Prior Publication Data

US 2014/0355014 A1 Dec. 4, 2014

(30) Foreign Application Priority Data

May 30, 2013 (JP) ................................. 2013-114486

(51) Int. Cl.
*G06K 15/02* (2006.01)
*H04N 1/23* (2006.01)
*G06K 15/14* (2006.01)
*H04N 1/29* (2006.01)
*H04N 1/50* (2006.01)
*G03G 15/01* (2006.01)
*B41J 2/525* (2006.01)

(52) U.S. Cl.
CPC .................................... *G06K 15/027* (2013.01)

(58) Field of Classification Search
None
See application file for complete search history.

(56) References Cited

U.S. PATENT DOCUMENTS

| | | | |
|---|---|---|---|
| 5,854,958 A * | 12/1998 | Tanimoto et al. | 399/49 |
| 6,215,512 B1 * | 4/2001 | Imaizumi et al. | 399/49 |
| 6,285,839 B1 | 9/2001 | Tanaka et al. | |
| 6,348,937 B2 * | 2/2002 | Hata | 347/116 |
| 6,603,574 B1 * | 8/2003 | Ramirez et al. | 358/1.9 |
| 6,871,026 B2 * | 3/2005 | Shimura et al. | 399/49 |
| 7,676,166 B2 * | 3/2010 | Saida et al. | 399/49 |
| 7,860,439 B2 * | 12/2010 | Kawada et al. | 399/301 |
| 7,937,007 B2 * | 5/2011 | Kobayashi et al. | 399/49 |
| 8,600,274 B2 * | 12/2013 | Uchiyama et al. | 399/301 |
| 2013/0242318 A1 * | 9/2013 | Yamaguchi et al. | 358/1.9 |
| 2014/0072351 A1 * | 3/2014 | Nishina et al. | 399/301 |
| 2014/0212186 A1 * | 7/2014 | Woo et al. | 399/301 |
| 2015/0003853 A1 * | 1/2015 | Nakagawa et al. | 399/49 |

FOREIGN PATENT DOCUMENTS

| | | |
|---|---|---|
| JP | H11-231736 A | 8/1999 |
| JP | 2013-050571 A | 3/2013 |

* cited by examiner

*Primary Examiner* — Scott A Rogers
(74) *Attorney, Agent, or Firm* — Banner & Witcoff, Ltd.

(57) ABSTRACT

An image-forming apparatus includes a rotary body, an image-forming unit, at least two sensors, and a control device. The image-forming unit performs an image-forming operation. The at least two sensors read an image formed on the rotary body. The control device is configured to: control the image-forming unit to form a test image on the rotary body; control the sensors to read the test image formed on the rotary body to acquire at least two values each relating to one of the at least two sensors; calculate a weighted average value of the at least two values by using weightings that are assigned to the at least two values, respectively, one of the weightings being different from another of the weightings; and correct the image-forming operation using the weighted average value.

10 Claims, 9 Drawing Sheets

IMAGE-FORMING APPARATUS ADJUSTING IMAGE-FORMING OPERATION USING VALUES ACQUIRED FROM DIFFERENT MEASUREMENT ENVIRONMENTS

CROSS REFERENCE TO RELATED APPLICATION

This application claims priority from Japanese Patent Application No. 2013-114486 filed May 30, 2013. The entire content of the priority application is incorporated herein by reference.

TECHNICAL FIELD

The present invention relates to an image-forming apparatus.

BACKGROUND

Some image-forming devices known in the art (see Japanese unexamined patent application publication No. 2013-050571, for example) perform a process to adjust the density or positioning of images formed by the device. First, the image-forming device forms images (hereinafter called "marks") on the outer surface of the intermediate transfer belt for detecting either density or positional deviation. Next, the image-forming device reads the marks formed on the belt with image-reading sensors and calculates the density or positioning of the marks from the results of the reading operation. If the density or positioning deviates from the target density or positioning, the device adjusts the corresponding settings.

SUMMARY

Here, the conventional image-forming device reads marks using a plurality of image-reading sensors and performs the above adjustments based on the results read by each sensor. However, the environments in which the sensors read marks (hereinafter called the "measurement environments") are not necessarily uniform. The conventional technology does not account for any differences in the measurement environments of individual sensors.

In view of the foregoing, it is an object of the present invention to provide an image-forming apparatus adjusting image-forming operations while accounting for differences in sensors that measure marks.

In order to attain the above and other objects, the invention provides an image-forming apparatus may include a rotary body, an image-forming unit, at least two sensors, and a control device. The image-forming unit may be configured to perform an image-forming operation. The at least two sensors may be configured to read an image formed on the rotary body. The control device may be configured to: control the image-forming unit to form a test image on the rotary body; control the at least two sensors to read the test image formed on the rotary body to acquire at least two values, each of the at least two values being determined based on a read image acquired by reading the test image with corresponding one of the at least two sensors; calculate a weighted average value of the at least two values by using weightings that are assigned to the at least two values, respectively, one of the weightings being different from another of the weightings; and correct the image-forming operation using the weighted average value.

According to another aspect, the present invention provides a method may include: controlling an image-forming unit of an image-forming apparatus to form a test image on a rotary body of the image-forming apparatus; controlling at least two sensors of the image-forming apparatus to read the test image formed on a rotary body of the image-forming apparatus to acquire at least two values, each of the at least two values being determined based on a read image acquired by reading the test image with corresponding one of the at least two sensors; calculating a weighted average value of the at least two values by using weightings that are assigned to the at least two values, respectively, one of the weightings being different from another of the weightings; and correcting an image-forming operation of the image-forming apparatus using the weighted average value.

According to another aspect, the present invention provides a non-transitory computer readable storage medium storing a set of program instructions executed by a computer. The program instructions may include: controlling an image-forming unit of an image-forming apparatus to form a test image on a rotary body of the image-forming apparatus; controlling at least two sensors of the image-forming apparatus to read the test image formed on the rotary body to acquire at least two values, each of the at least two values being determined based on a read image acquired by reading the test image with corresponding one of the at least two sensors; calculating a weighted average value of the at least two values by using weightings that are assigned to the at least two values, respectively, one of the weightings being different from another of the weightings; and correcting an image-forming operation of the image-forming apparatus using the weighted average value.

BRIEF DESCRIPTION OF THE DRAWINGS

The particular features and advantages of the invention as well as other objects will become apparent from the following description taken in connection with the accompanying drawings, in which.

DETAILED DESCRIPTION

First Embodiment

Next, a first embodiment of the present invention will be described with reference to FIGS. 1 through 8.

(1) Structure of a Printer

First, the structure of a printer 1 serving as an image-forming apparatus according to the first embodiment will be described with reference to FIG. 1. The printer 1 is a direct transfer tandem color laser printer that prints color images on a recording medium such as a printing paper M using toner in the colors cyan (C), magenta (M), yellow (Y), and black (K).

The printer 1 includes a housing 10, a paper-accommodating unit 20, a conveying unit 30, an image-forming unit 40, and optical sensors 70.

The housing 10 has a box-like shape with an access opening 13 formed in the top thereof. A cover 11 is coupled to the housing 10 and is capable of opening and closing over the access opening 13.

The paper-accommodating unit 20 has a paper tray 21 in which sheets of printing paper M are stacked.

The conveying unit 30 has a belt unit 32, and various conveying rollers. The conveying unit 30 conveys sheets of printing paper M accommodated in the paper-accommodating unit 20 one sheet at a time along a conveying path T.

The belt unit 32 includes an endless conveying belt 35, a support member 31 for supporting the conveying belt 35 so that the conveying belt 35 can circulate, and a drive motor (not shown). The support member 31 includes a drive roller 33, and a follow roller 34. When placed around the drive roller 33 and follow roller 34, the conveying belt 35 is supported by the support member 31 so as to be capable of circulating. The conveying belt 35 is an example of the rotary body and a circular belt.

Figure 1:
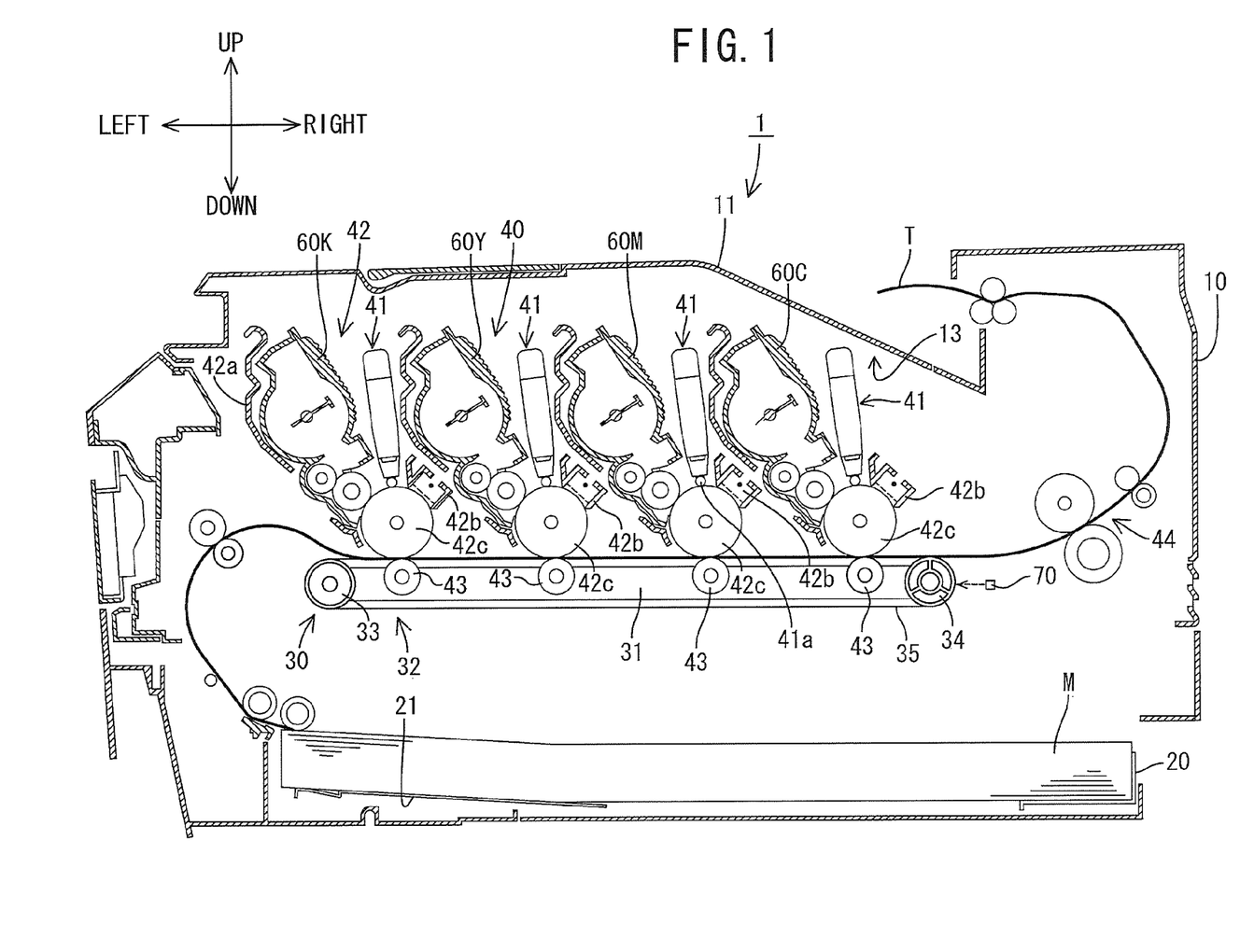
FIG. 1 shows an image-forming apparatus according to a first embodiment of the present invention.

The conveying belt 35 circulates in the clockwise direction of FIG. 1 so as to convey sheets of printing paper M from left to right. In the following description, the direction in which the printing paper M is conveyed by the conveying belt 35 will be called the sub scanning direction. The direction perpendicular to the surface of the drawing in FIG. 1 and orthogonal to the conveying direction will be called the main scanning direction.

The image-forming unit 40 includes a plurality of exposure units 41, a process cartridge 42, a plurality of transfer rollers 43, and a fixing unit 44.

Each exposure unit 41 has an LED head 41a that includes a plurality of LEDs arranged linearly along the main scanning direction. The exposure units 41 emit light from LEDs based on image signals outputted from a control unit 80 (described later with reference to FIG. 2) in order to expose the outer circumferential surfaces of corresponding photosensitive drums 42c.

Each of the exposure units 41 may be configured of a light source, a polygon mirror for deflecting light emitted from the light source, and an optical system for forming an image on the surface of the corresponding photosensitive drum 42c using light deflected by the polygon mirror.

The process cartridge 42 includes a cartridge frame 42a, four chargers 42b, and four photosensitive drums 42c.

The cartridge frame 42a is removably mounted in the printer 1. Toner cartridges 60 for the four colors cyan, magenta, yellow, and black (60C, 60M, 60Y, and 60K) are detachably mounted in the cartridge frame 42a.

The chargers 42b are Scorotron-type chargers, for example, and function to apply a uniform positive charge to the peripheral surfaces of the corresponding photosensitive drums 42c.

After the chargers 42b have charged the outer peripheral surfaces of the corresponding photosensitive drums 42c, the outer peripheral surfaces are exposed by light emitted from the corresponding exposure units 41, forming electrostatic latent images on the outer peripheral surfaces. The latent images formed on the outer peripheral surfaces of the photosensitive drums 42c are developed into toner images by toner supplied from the corresponding toner cartridges 60.

The transfer rollers 43 are disposed at positions confronting corresponding photosensitive drums 42c with the conveying belt 35 interposed therebetween. A negative transfer bias is applied to the transfer rollers 43 for sequentially transferring the toner images carried on the outer peripheral surfaces of the photosensitive drums 42c onto a sheet of printing paper M as the sheet passes through transfer positions between corresponding photosensitive drums 42c and transfer rollers 43.

The fixing unit 44 thermally fixes the transferred toner images to the printing paper M. After the toner images are fixed to the sheets of printing paper M, the sheet is discharged into a discharge tray formed on the cover 11.

Figure 2:
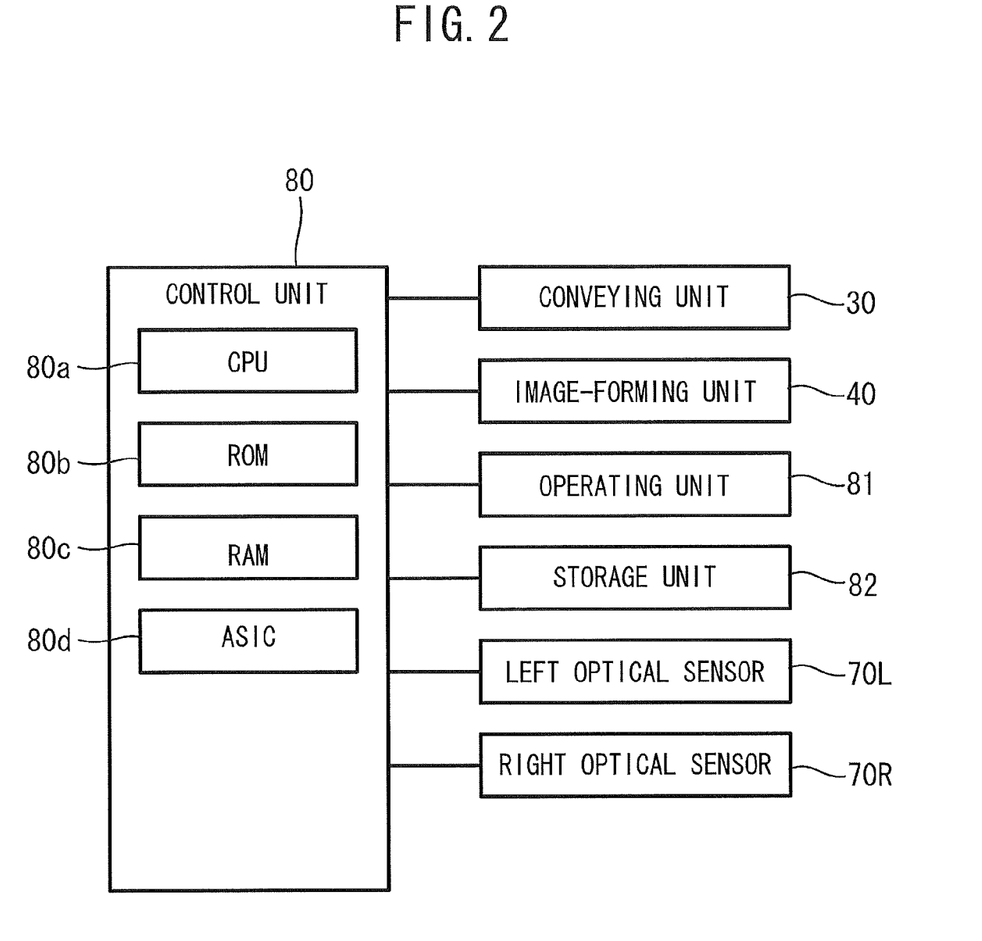
FIG. 2 is a block diagram showing the image-forming apparatus according to the first embodiment.

While only a single optical sensor 70 is shown in FIG. 1, the printer 1 is provided with a left optical sensor 70L and a right optical sensor 70R (see FIG. 2). The two optical sensors 70 (the left optical sensor 70L and the right optical sensor 70R) are spaced apart from each other in the main scanning direction, which is perpendicular to the surface of the drawing in FIG. 1.

Figure 3:
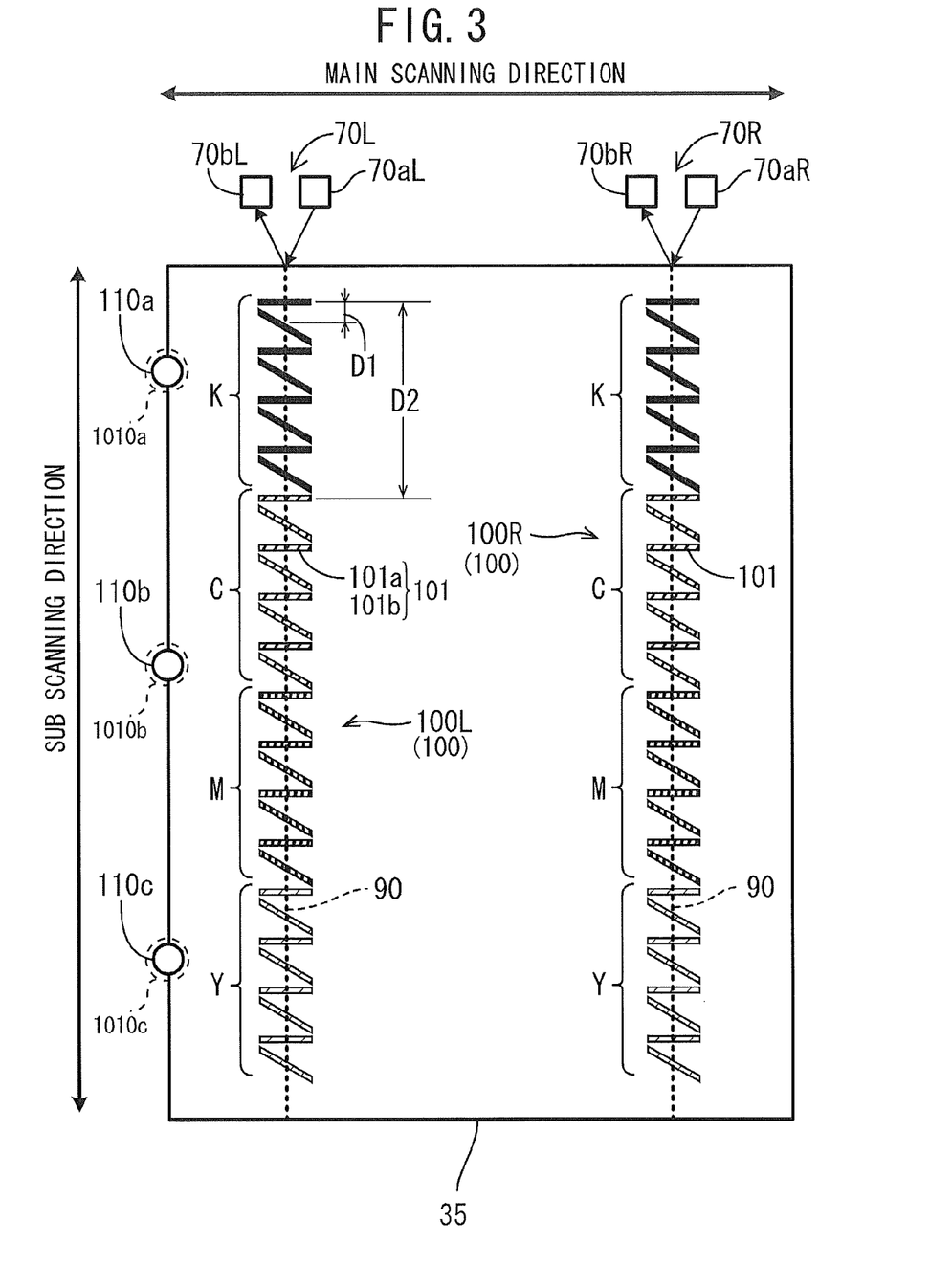
FIG. 3 is an explanatory diagram showing a correction of positional offset performed by the image-forming apparatus according to the first embodiment.

Each of optical sensors 70 (the left optical sensor 70L and the right optical sensor 70R) has a light-emitting element 70a (70aL, 70aR) and a light-receiving element 70b (70bL, 70bR) (see FIG. 3). The light-emitting element 70a (70aL, 70aR) emits light toward the outer peripheral surface of the conveying belt 35 on the downstream side of the conveying belt 35 with respect to the conveying direction of the printing paper M. The light-receiving element 70b (70bL, 70bR) receives light emitted from the light-emitting element 70a (70aL, 70aR) and reflected off the outer surface of the conveying belt 35.

Each optical sensor 70 outputs a signal to the control unit 80 corresponding to the intensity of light received by the light-receiving element 70b (70bL, 70bR).

(2) Electrical Structure of the Printer

Next, the electrical structure of the printer 1 will be described with reference to FIG. 2. In addition to the control unit 80, conveying unit 30, image-forming unit 40, left optical sensor 70L, and right optical sensor 70R, the printer 1 includes an operating unit 81 and a storage unit 82. The conveying unit 30, image-forming unit 40, left optical sensor 70L, and right optical sensor 70R have already been described. Therefore, the following description will cover only the control unit 80, operating unit 81, and storage unit 82.

The control unit 80 includes a CPU 80a, a ROM 80b, a RAM 80c, and an ASIC 80d. The CPU 80a controls components of the printer 1 by executing various control programs stored in the ROM 80b and storage unit 82. In addition to the control programs executed by the CPU 80a, the ROM 80b stores various data and the like. The RAM 80c is used as the primary storage device of the CPU 80a when the CPU 80a executes the various processes.

The operating unit 81 includes a liquid crystal display, buttons, and the like. The user operates the operating unit 81 to input settings, commands, and the like.

The storage unit 82 employs nonvolatile memory, such as a hard disk or flash memory, to store various programs and data. The storage unit 82 specifically stores conditions for forming correction patterns described later, and numerical values indicating the image-forming positions of the image-forming unit 40 for each of the CMYK colors. The correction pattern is an example of a test image.

(3) Correcting Positional Offset

Vibrations produced by rotations of the drive motor in the printer 1 and circulation of the conveying belt 35 might cause positional deviations in the image formed by the image-forming unit 40. That is, the position of the image formed by the image-forming unit 40 might deviate from the desired printing position. A printer 1 capable of printing color images prints a plurality of images in different colors. If one of these colors is considered a reference color, color registration error is said to occur when the position of an image formed in one of the other colors deviates relative to the position of the image formed in the reference color.

Generally there are more opportunities for vibrations to occur as the number of printed sheets accumulates, increasing the amount of positional deviation in images. Therefore, the printer 1 according to the first embodiment corrects positional deviation for the first print command received after the accumulated number of printed sheets reaches a prescribed number that has been set in advance.

The method of correcting positional deviation will be described here with reference to FIG. 3. Dotted lines 90 in FIG. 3 conceptually indicate the regions on the outer surface of the conveying belt 35 that the optical sensors 70 measure.

To correct positional deviation, the control unit 80 controls the image-forming unit 40 to form offset correction patterns 100 on the outer surface of the conveying belt 35. In the example of FIG. 3, an offset correction pattern 100 is formed for each optical sensor 70. In the following description, the offset correction pattern 100 measured by the left optical sensor 70L will be called the left-side offset correction pattern 100L, and the offset correction pattern 100 measured by the right optical sensor 70R will be called the right-side offset correction pattern 100R.

Each of the offset correction patterns 100 formed on the conveying belt 35 includes four sets of linear marks 101 formed apart from each other in the sub scanning direction. Each set of marks 101 includes one horizontal mark 101a aligned in the main scanning direction and one slanted mark 101b that slopes downward to the right. Only one of the marks 101 (101a and 101b) in each of the offset correction patterns 100 is labeled in FIG. 3. Further, only four sets of marks 101 are depicted for each color in FIG. 3 for the purposes of conceptually illustrating the offset correction patterns 100, but in fact numerous sets are formed.

The control unit 80 detects the amount of positional deviation in the offset correction pattern 100 relative to the main scanning direction. This detection process will be described next using the example of black (K) marks 101 formed in the left-side offset correction pattern 100L.

First, the control unit 80 determines a distance D1 for the black marks between the center point of a horizontal mark 101a in the sub scanning direction and the center point of a slanted mark 101b in the sub scanning direction based on the output signal from the left optical sensor 70L. Next, the control unit 80 detects the amount of positional deviation in the main scanning direction for the black marks 101 based on the difference between the distance D1 and a reference distance for the main scanning direction. The amount of positional deviation is an example of the measurement value.

The control unit 80 performs this detection on four sets of black marks 101 to detect the amount of positional deviation in the main scanning direction four times. The control unit 80 then sets the amount of positional deviation in the main scanning direction for black in the left-side offset correction pattern 100L to the simple average of these four amounts of positional deviation. This completes the process for detecting the amount of positional deviation in the main scanning direction for black in the left-side offset correction pattern 100L.

The control unit 80 performs the detection process described above for each of the CMYK colors. Accordingly, an amount of positional deviation in the main scanning direction is determined for each of the CMYK colors in the left-side offset correction pattern 100L.

Next, the process of detecting amounts of positional deviation in the sub scanning direction relative to black marks 101 in the left-side offset correction pattern 100L will be described using the example of cyan (C). First, the control unit 80 determines a distance D2 between the center point in the sub scanning direction of a black horizontal mark 101a and the center point in the sub scanning direction of a cyan horizontal mark 101a based on the output signal from the left optical sensor 70L. Next, the control unit 80 detects the amount that the cyan mark deviates in the sub scanning direction relative to the black mark 101 based on the difference between the distance D2 and a reference distance for the sub scanning direction.

The control unit 80 performs this detection for four sets of cyan and black marks 101, detecting four amounts of positional deviation in the sub scanning direction between cyan and black. The control unit 80 then sets the amount of positional deviation in the sub scanning direction between cyan marks 101 and black marks 101 in the left-side offset correction pattern 100L to the simple average of these four amounts of positional deviation. For this process, the control unit 80 determines one value indicating the amount that cyan marks deviate in the sub scanning direction from corresponding black marks in the left-side offset correction pattern 100L.

The control unit 80 performs this detection process for each of the CMY colors. Accordingly, the control unit 80 detects one value for each of the CMY colors indicating the amount that marks 101 in these colors deviate in the sub scanning direction relative to corresponding black marks 101 in the left-side offset correction pattern 100L.

The control unit 80 similarly detects the amount of positional deviation in the main scanning direction for each of the CMYK colors in the right-side offset correction pattern 100R and the amount of positional deviation in the sub scanning direction relative to black for each of the CMY colors in the right-side offset correction pattern 100R.

As will be described later in greater detail, the control unit 80 averages the amounts of deviation in the main scanning direction detected using both the left optical sensor 70L and the right optical sensor 70R for each of the CMYK colors, and sets the amount of positional deviation in the main scanning direction for each color to their respective average value. In this way, the control unit 80 ultimately determines one value for each of the CMYK colors indicating positional deviation in the main scanning direction.

Similarly, as will be described later in greater detail, the control unit 80 averages the amounts of positional deviation in the sub scanning direction relative to black detected using both the left-side offset correction pattern 100L and right-side offset correction pattern 100R for each of the CMY colors, and sets the amount of positional deviation in the sub scanning direction for each of the CMY colors relative to black to their respective average value. In this way, the control unit 80 ultimately determines one value for each of the CMY colors indicating positional deviation in the sub scanning direction relative to black.

Next, the control unit 80 overwrites numerical values stored in the storage unit 82 to indicate image-forming positions for each of the CMYK colors based on the detected amounts of positional deviation in order that the amounts of positional deviation in the main and sub scanning directions approach 0 (zero). Correcting the image-forming positions is an example of correcting the image-forming operation.

(4) Difference in Measurement Environments for Two Optical Sensors

Next, a difference in the measurement environments of two optical sensors 70 will be described with reference to FIG. 3. Circular marks in FIG. 3 denote locations 110*a*, 110*b*, and 110*c* at which the support member 31 is fixed in position. More specifically, the left side of the support member 31 is fixed in position in the sub scanning direction at the three locations 110*a*, 110*b*, and 110*c* using positioning parts 1010*a*, 1010*b*, and 1010*c* provided in the housing 10.

In contrast, the right side of the support member 31 is anchored with anchoring parts (not shown) provided in the housing 10. The anchoring parts anchor the support member 31 so that the support member 31 has a degree of play in the sub scanning direction. Accordingly, the anchoring parts do not function to position the support member 31 relative to the sub scanning direction.

In other words, the support member 31 is positioned relative to the sub scanning direction at only three locations on the left side thereof. With this construction, vibrations in the sub scanning direction are better suppressed in the left side of the support member 31 than the right side. In other words, the left optical sensor 70L measures the left-side offset correction pattern 100L in an environment in which vibrations in the sub scanning direction are less likely to be produced in the conveying belt 35, while the right optical sensor 70R measures the right-side offset correction pattern 100R in an environment in which vibrations in the sub scanning direction are more likely to be produced in the conveying belt 35. Thus, the measurement environment differs between the left optical sensor 70L and right optical sensor 70R.

This difference in measurement environments between the left optical sensor 70L and right optical sensor 70R described above produces a difference in the variability of values for positional deviation detected for sets of marks using the left optical sensor 70L and the variability of such values detected using the right optical sensor 70R.

Figure 4:
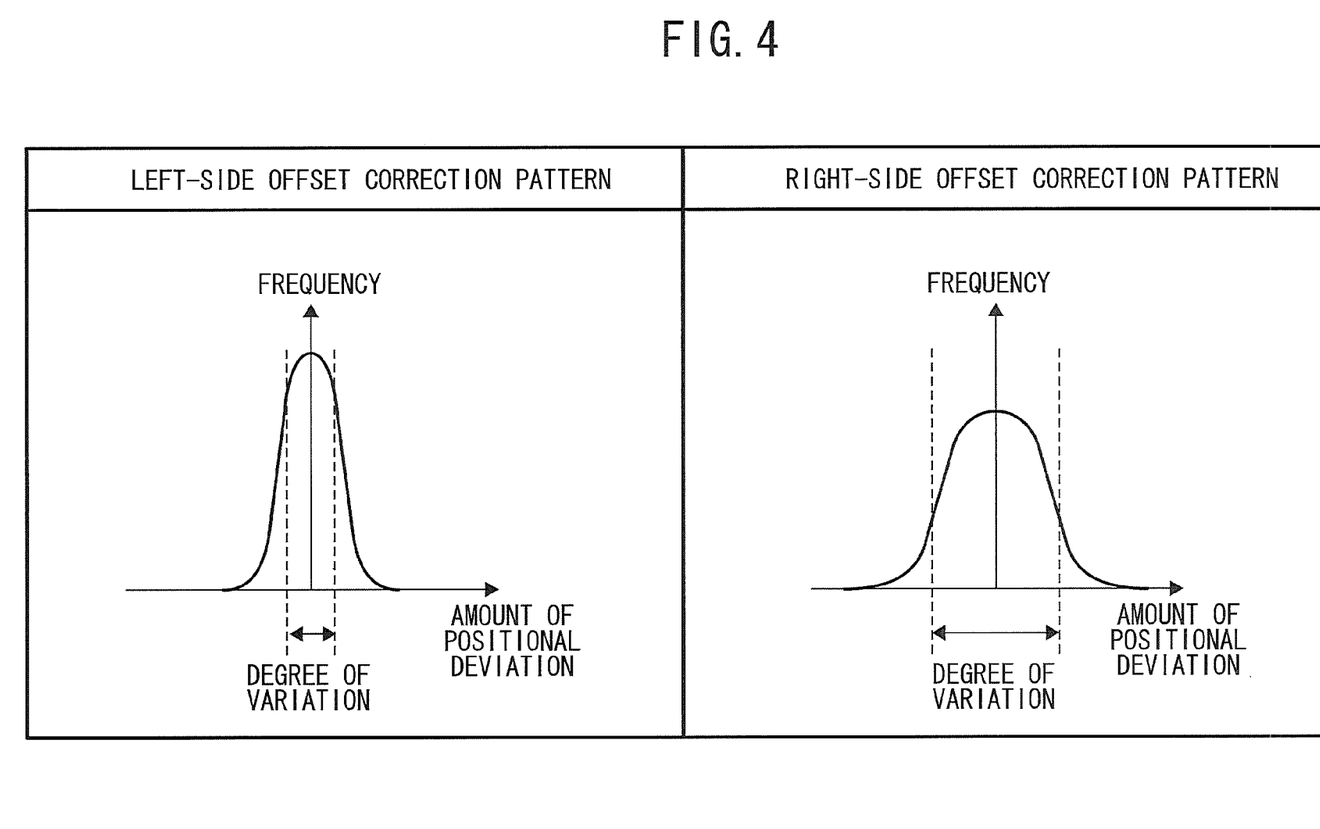
FIG. 4 shows histograms indicating amounts of positional deviation.

This difference in variability will be described with reference to FIG. 4. FIG. 4 is a histogram indicating the amounts of positional deviation in the main scanning direction detected for sets of black marks 101. As shown in FIG. 4, the variability of values for positional deviation detected using the right-side offset correction pattern 100R is greater than the variability of positional deviation detected using the left-side offset correction pattern 100L.

Generally, the reliability of measured values (i.e., the amounts of positional deviation in this case) declines when the variability increases. Thus, the precision for correcting positional deviation drops when taking a simple average of positional deviation detected with the left optical sensor 70L and positional deviation detected with the right optical sensor 70R. Therefore, rather than taking the simple average of positional deviation detected using both the left optical sensor 70L and right optical sensor 70R, the control unit 80 according to the first embodiment takes a weighted average whose weights reflect the variability of the positional deviation values.

Here, descriptions will be given first for measures of variability and then for an equation used to calculate the weighted average.

The following measures A-E are some possibilities for measures of variability.

Measure A: difference between the maximum and minimum amounts of positional deviation Measure B: variance Measure C: standard deviation Measure D: sum of the absolute values of differences between the simple average of amounts of positional deviation and the individual amounts of positional deviation Measure E: quotient of the sum of the absolute values of differences between the simple average of amounts of positional deviation and the individual amounts of positional deviation divided by the average value Note that the measure of variability may be arbitrarily selected and is not limited to these examples.

Next, the equation used for calculating the weighted average will be described. The control unit 80 calculates a weighted average value V according to Equation 1 below.

$$V = \frac{XRd}{XLd + XRd} \times XL + \frac{XLd}{XLd + XRd} \times XR \qquad \text{Equation 1}$$

Here, using the amounts of positional deviation in the main scanning direction among black marks as an example, XL in the equation 1 denotes the average value of amounts of positional deviation in the main scanning direction detected for each set of black marks and XLd denotes the variability of positional deviation in the main scanning direction for each set of black marks in the left-side offset correction pattern 100L; and XR denotes the average value of amounts of positional deviation in the main scanning direction detected for each set of black marks and XRd denotes the variability of positional deviation in the main scanning direction for each set of black marks in the right-side offset correction pattern 100R. While this example covers positional deviation among black marks in the main scanning direction, amounts of positional deviation in the main scanning direction are similarly calculated for cyan, magenta, and yellow. Further, the amounts of positional deviation in the sub scanning direction are similarly calculated between each of the cyan, magenta, and yellow marks and the black marks.

Since standard deviation is the square root of variance, measurement environments are reflected differently in weighting when using variance as the measure of variability and when using standard deviation as the measure of variability.

The developers of the printer 1 may determine what measure is preferable through experimentation performed at the development stage. Specifically, the developers would perform separate experiments using each of these measures to actually correct the amounts of positional deviation. After performing these adjustments, the developers would once again form offset correction patterns 100 and detect the amounts of positional deviation using the left optical sensor 70L and right optical sensor 70R. Since the amounts of positional deviation detected with the left optical sensor 70L or the right optical sensor 70R are the values for positional deviation prior to weighted averaging, magnitudes of positional deviation can be compared under the same conditions when using different measures of variability for correction.

Next, the developers could configure a control program for the printer 1 that uses the measure producing the smallest amounts of positional deviation or that prompts the user to select what measure of variability to use.

(5) Process for Correcting Positional Deviation

Figure 5:
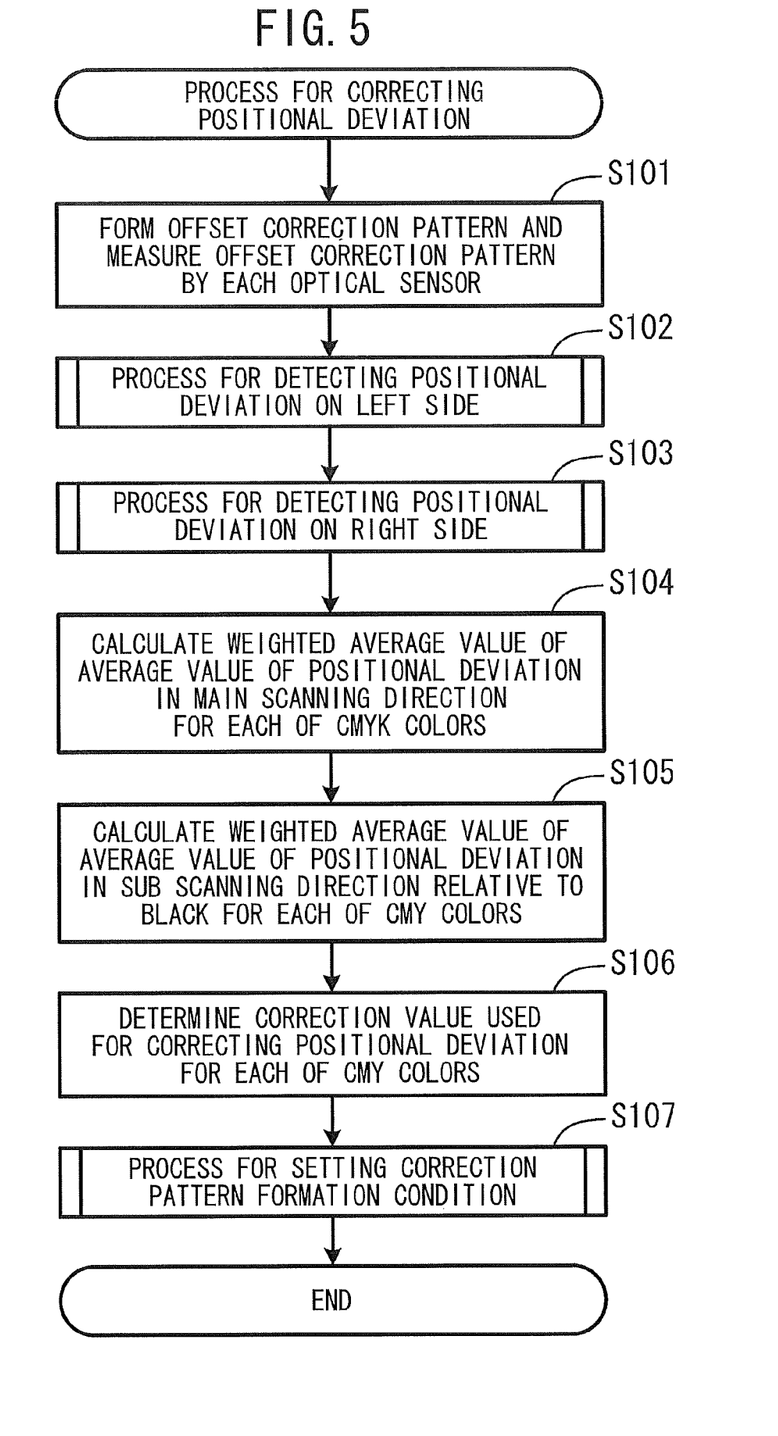
FIG. 5 is a flowchart illustrating steps in a process for correcting positional deviation executed by the image-forming apparatus according to the first embodiment.

Next, steps in a process for correcting a positional deviation will be described with reference to FIG. 5. In S101, the CPU 80a controls the conveying unit 30 to begin circulating the conveying belt 35. While the conveying belt 35 is circulating, the CPU 80a controls the image-forming unit 40 to form the left-side offset correction pattern 100L and the right-side offset correction pattern 100R on the surface of the conveying belt 35.

During this process, the offset correction patterns 100 are formed based on formation conditions for forming correction patterns stored in the storage unit 82. The formation conditions are data indicating the number of sets of marks and the length of the marks in the main scanning direction for each color in both the left-side offset correction pattern 100L and the right-side offset correction pattern 100R. The formation conditions are set according to a process for setting correction pattern formation conditions described later either during the last time the process for correcting positional deviation was performed or during a time prior to the last time.

Next, the CPU 80a measures the offset correction patterns 100 with the left optical sensor 70L and right optical sensor 70R while the conveying belt 35 is circulating.

In S102 the CPU 80a executes a process for detecting positional deviation on the left side. This process includes a process for detecting the amount of positional deviation in the main scanning direction between each set of marks 101 in each of the CMYK colors, a process for detecting the amount of positional deviation in the sub scanning direction for marks 101 in the CMY colors relative to black marks 101, and a process for calculating variability based on the output signal from the left optical sensor 70L. This process for detecting positional deviation on the left side will be described later in greater detail.

In S103 the CPU 80a executes a process for detecting positional deviation on the right side. This process is essentially identical to the process performed on the left side described above (S102), except that the output signal from the right optical sensor 70R is used.

In S104 the CPU 80a calculates the weighted average value of positional deviation in the main scanning direction according to Equation 1 described above for each of the CMYK colors using the average value of positional deviation in the main scanning direction detected for each set of marks 101 in S102, the variability of positional deviation in the main scanning direction detected for each set of marks in S102, the average value of positional deviation in the main scanning direction detected for each set of marks in S103, and the variability of positional deviation in the main scanning direction detected for each set of marks in S103.

In S105 the CPU 80a calculates the weighted average value of positional deviation in the sub scanning direction relative to black according to Equation 1 described above for each of the CMY colors using the average value of positional deviation in the sub scanning direction detected for each set of marks in S102, the variability of positional deviation in the sub scanning direction detected for each set of marks in S102, the average value of positional deviation in the sub scanning direction detected for each set of marks in S103, and the variability of positional deviation in the sub scanning direction detected for each set of marks in S103.

In S106 the CPU 80a overwrites numerical values stored in the storage unit 82 that indicate the image-forming positions of the image-forming unit 40 based on the weighted average values calculated in S104 and S105 for each of the CMY colors in order that the amounts of positional deviation in the main scanning direction and sub scanning direction approach 0 (zero).

In S107 the CPU 80a executes the process for setting correction pattern formation conditions. In this process the CPU 80a establishes correction pattern formation conditions to be used in the next process for correcting positional deviation. The process for setting correction pattern formation conditions will be described next in greater detail.

(5-1) Process for Detecting Positional Deviation on the Left Side

Figure 6:
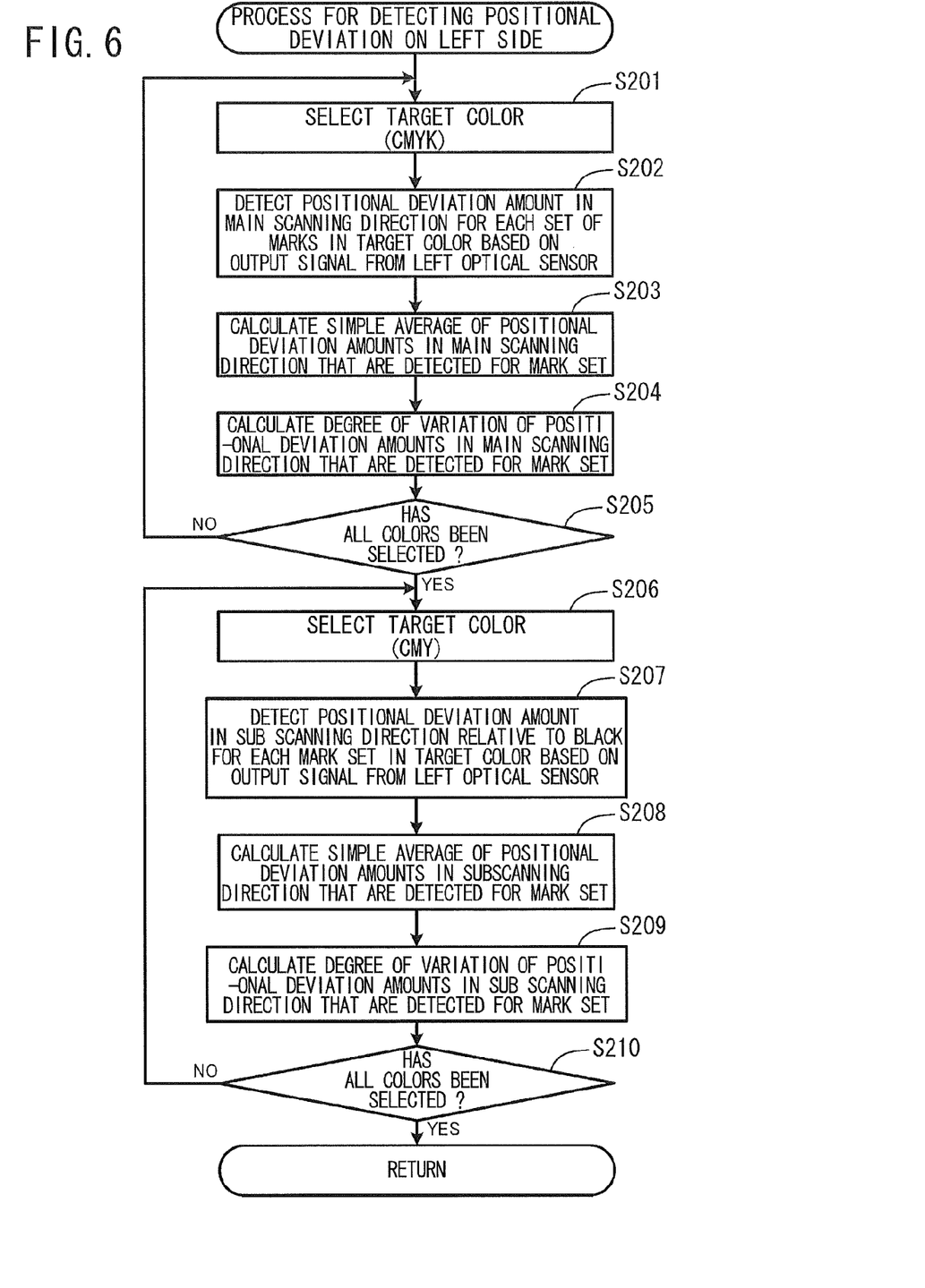
FIG. 6 is a flowchart illustrating steps in a process for detecting positional deviation on left side in the process executed by the image-forming apparatus according to the first embodiment.

Next, the process for detecting positional deviation on the left side executed in S102 will be described with reference to FIG. 6. In S201 of FIG. 6, the CPU 80a selects one color from among the CMYK colors. The color selected in S201 will be called the target color in the following description.

In S202 the CPU 80a detects the amount of positional deviation in the main scanning direction between each set of marks in the target color based on the output signal from the left optical sensor 70L. The output signal is an example of a read image acquired by reading a test image with the sensor. In S203 the CPU 80a calculates the simple average of positional deviation amounts in the main scanning direction detected for each set of marks in S202.

In S204 the CPU 80a calculates the variability of amounts of positional deviation in the main scanning direction detected for each set of marks in S202. In S205 the CPU 80a determines whether all colors have been selected to be the target color. The CPU 80a advances to S206 when all colors have been selected (S205: YES) and returns to S201 to repeat the above process when there remain colors that have not yet been selected (S205: NO).

In S206 the CPU 80a selects one color from among the CMY colors. Since black serves as the reference color, black is excluded from the possible color selections. The color selected in S206 will be referred to as the target color in the following description. In S207 the CPU 80a detects the amount of positional deviation in the sub scanning direction relative to black for the target color based on the output signal from the left optical sensor 70L.

In S208 the CPU 80a calculates the simple average of the amounts of positional deviation in the sub scanning direction detected in S207 for each corresponding set of marks in the target color and black. In S209 the CPU 80a calculates the variability of amounts of positional deviation in the sub scanning direction detected for each set of marks in S207.

In S210 the CPU 80a determines whether all possible colors have been selected. The CPU 80a returns to the process for correcting positional deviation in FIG. 5 when all colors have been selected (S210: YES) and returns to S206 to repeat the above process when there remain colors that have yet to be selected (S210: NO).

The process for detecting positional offset on the right side is essentially identical to the process described above for the left side, except that the output signal from the right optical sensor 70R is used. Therefore, a description of this process has been omitted.

(5-2) Process for Setting Correction Pattern Formation Conditions

Figure 7:
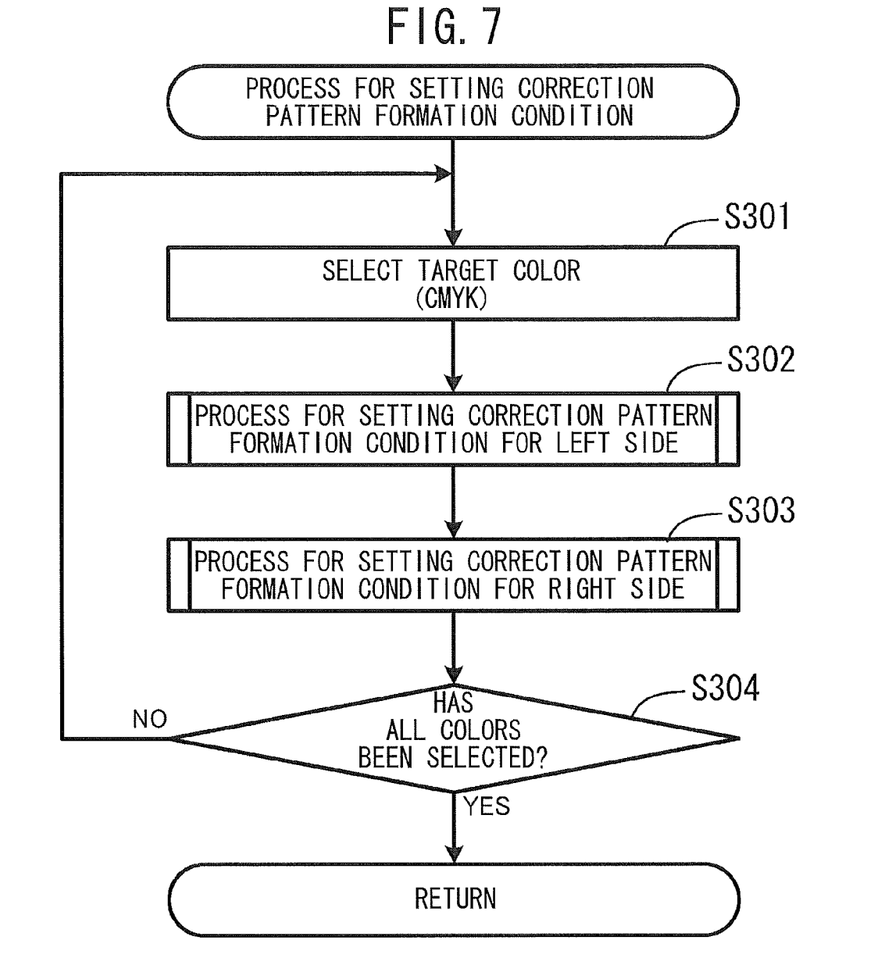
FIG. 7 is a flowchart illustrating steps in a process for setting correction pattern formation condition executed by the image-forming apparatus according to the first embodiment.

Next, the process for setting correction pattern formation conditions executed in S107 will be described with reference to FIG. 7. In S301 of FIG. 7, the CPU 80a selects one color from among the CMYK colors. The color selected in S301 will be called the target color in the following description.

In S302 the CPU 80a executes a process for setting correction pattern formation conditions for the left side. In S303 the CPU 80a executes a process for setting correction pattern formation conditions for the right side.

In S304 the CPU 80a determines whether all colors have been selected. The CPU 80a returns to the process for correcting positional deviation if all colors have been selected (S304: YES) and returns to S301 to repeat the above process when there remain colors that have not yet been selected (S304: NO).

(5-3) Process for Setting Correction Pattern Formation Conditions for the Left Side Next, the process for setting correction pattern formation conditions for the left side executed in S302 will be described with reference to FIG. 8. This process is performed for each color to set correction pattern formation conditions to be used in the next process for correcting positional deviation based on variability. The variability used in this case may be the variability of positional deviation in the main scanning direction or the variability of positional deviation relative to black in the sub scanning direction. Here, an example will be given for using the variability of positional deviation in the main scanning direction.

Figure 8:
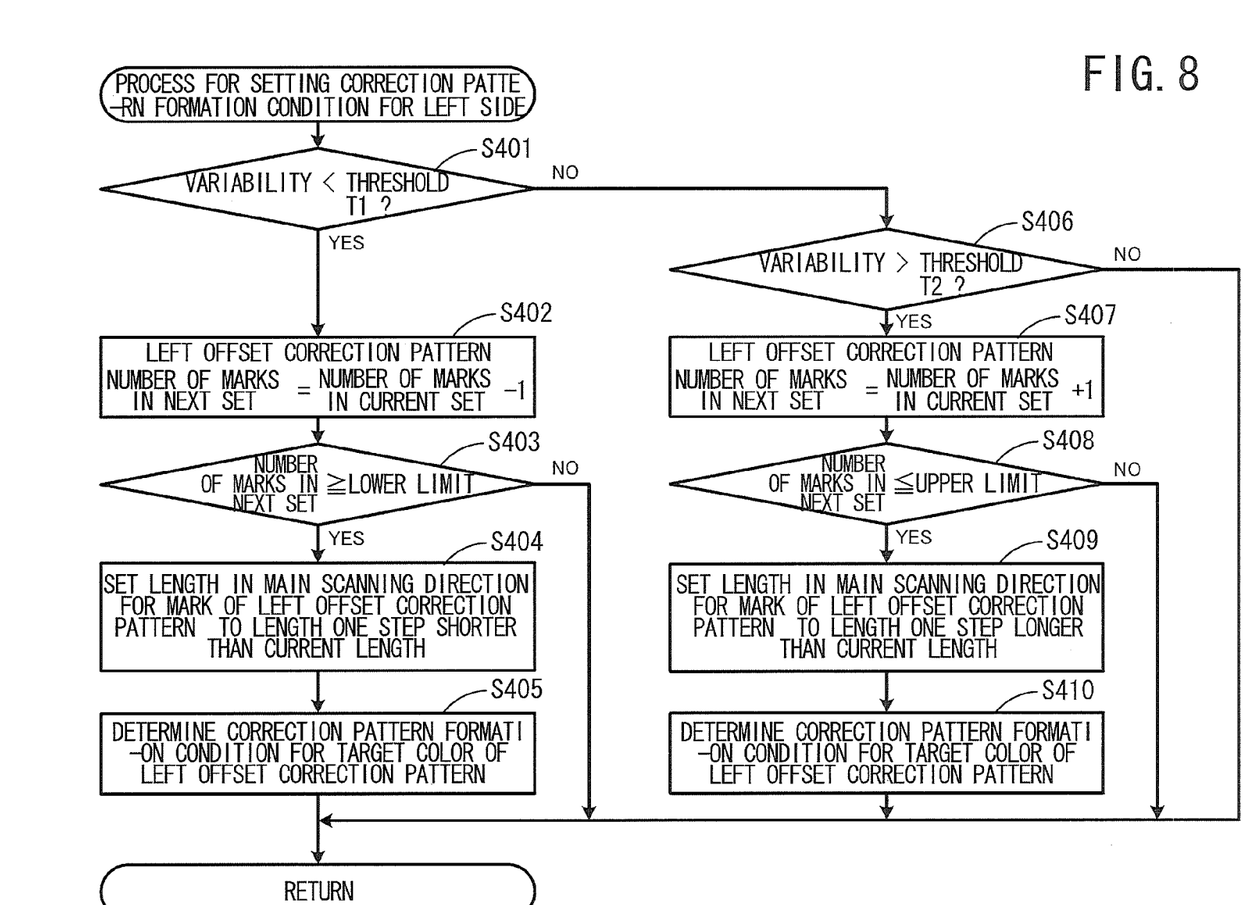
FIG. 8 is a flowchart illustrating steps in a process for setting correction pattern formation condition for left side executed by the image-forming apparatus according to the first embodiment.

In S401 of FIG. 8, the CPU 80a determines for the target color selected in S301 whether the variability of positional deviation in the main scanning direction calculated in S204 is less than a threshold value T1. The threshold value T1 is found through experimentation as the threshold of variability at which the precision in detecting positional deviation does not decline even if the number of sets of marks constituting the offset correction pattern 100 is reduced and the length of the marks 101 in the main scanning direction is shortened in the next process for correcting positional deviation. The CPU 80a advances to S402 if the variability is less than the threshold value T1 (S401: YES) and advances to S406 if the variability is greater than or equal to the threshold value T1 (S401: NO).

In S402 the CPU 80a sets a provisional number of sets of marks in the target color constituting the left-side offset correction pattern 100L to be formed in the next process for correcting positional deviation to the number obtained by decrementing by 1 the number of sets of marks constituting the left-side offset correction pattern 100L formed in the current process.

In S403 the CPU 80a determines whether the provisional number of marks set in S402 is greater than or equal to a predetermined lower limit. The CPU 80a advances to S404 when the provisional number is greater than or equal to the lower limit (S403: YES) and ends the current process and returns to the process for setting correction pattern formation conditions when the provisional number is less than the lower limit (S403: NO).

In S404 the CPU 80a sets the length in the main scanning direction for marks 101 of the target color constituting the left-side offset correction pattern 100L to be formed in the next process for correcting positional deviation to a length one step shorter than that of the marks 101 in the target color constituting the left-side offset correction pattern 100L formed in the current process for correcting positional deviation.

In S405 the CPU 80a writes the number of sets of marks 101 provisionally set in S402 and the mark length set in S404 in the storage unit 82 as the correction pattern formation conditions for the target color of the left-side offset correction pattern 100L to be formed in the next process for correcting positional deviation.

Since the processes in S404 and S405 are not executed when the CPU 80a determines that the provisional number of sets established in S402 for the next process is less than the lower limit (S403: NO), the number of sets of marks 101 and the dimension of the marks 101 in the main scanning direction for the left-side offset correction pattern 100L formed in the current process remain unchanged for the left-side offset correction pattern 100L formed in the next process.

In S406 the CPU 80a determines whether the variability calculated in S204 for the target color is greater than a threshold value T2, which is larger than the threshold value T1. The threshold value T2 is found in advance through experimentation as the threshold of variability at which positional deviation cannot be detected with the same precision as when the variability is smaller unless the number of sets of marks 101 constituting the offset correction pattern 100 is increased and the length of the marks 101 in the main scanning direction is lengthened in the next process for correcting positional deviation.

The CPU 80a advances to S407 if the variability is greater than the threshold value T2 (S406: YES) and ends the current process and returns to the process for setting correction pattern formation conditions if the variability is less than or equal to the threshold value T2 (S406: NO).

In S407 the CPU 80a sets a provisional number of marks 101 in the target color constituting the left-side offset correction pattern 100L to be formed in the next process for correcting positional deviation to the number obtained by incrementing by 1 the number of sets of marks in the target color constituting the left-side offset correction pattern 100L formed in the current process. In S408 the CPU 80a determines whether the number of mark sets provisionally set in S407 is less than or equal to a predetermined upper limit. The CPU 80a advances to S409 when the provisionally set number of mark sets is no greater than the upper limit (S408: YES), and ends the current process and returns to the process for setting correction pattern formation conditions when the number of sets is greater than the upper limit (S408: NO).

In S409 the CPU 80a sets the length in the main scanning direction of marks 101 in the target color constituting the left-side offset correction pattern 100L to be formed in the next process for correcting positional deviation to a length one step longer than the length in the main scanning direction of the marks 101 in the target color constituting the left-side offset correction pattern 100L formed in the current process.

In S410 the CPU 80a writes the number of sets of marks 101 provisionally set in S407 and the length of marks 101 in the main scanning direction set in S409 in the storage unit 82 as the correction pattern formation conditions for marks 101 in the target color constituting the left-side offset correction pattern 100L to be formed in the next process for correcting positional deviation.

Here, the processes in S409 and S410 are not executed when the number of mark sets provisionally set in S407 is greater than the upper limit (S408: NO). In this case, the number of marks 101 in the target color and the lengths of the marks 101 in the main scanning direction for the left-side offset correction pattern 100L formed in the current process are kept the same for the left-side offset correction pattern 100L formed in the next process.

The process for setting correction pattern formation conditions for the right side is essentially the same as the process for setting correction pattern formation conditions for the left side described above, except that the CPU 80a uses the variability of positional deviation values for the main scanning direction that was calculated in the process for detecting positional deviation on the right side. Therefore, a description of the process for setting correction pattern formation conditions for the right side has been omitted.

(6) Effects of the First Embodiment

Normally, when an optical sensor 70 is used to measure a plurality of marks 101, there is variation in the measured values for the marks 101, i.e., the amounts of positional deviation. The degree of variation, i.e. "variability," in the amounts of positional deviation will also differ between optical sensors 70 if their measurement environments are not the same. Thus, it may be said that the measurement environments are reflected in the variability of positional deviation. Since the printer 1 according to the first embodiment calculates the variability of positional deviation for each optical sensor 70 and incorporates these values of variability in weighted averaging, the printer 1 can correct image-forming positions of the image-forming unit 40 while accounting for differences in measurement environments among the optical sensors 70.

Further, when the printer 1 includes the left optical sensor 70L and right optical sensor 70R, the printer 1 can use Equation 1 described earlier to reflect the variability of each sensor in the weighted average. By giving more weight to measured values with less variability (i.e., measured values with higher reliability) than measured values with greater variability (i.e., measured values with lower reliability), the image-forming device of the present invention obtains more reliable average values than when a simple average is taken.

Further, when the variability is less than the threshold value T1, the printer 1 reduces the number of sets of marks constituting the offset correction pattern 100 to be formed the next time from the number of sets used this time and/or shortens the length in the main scanning direction of the marks 101 constituting the offset correction patterns 100 to be formed the next time. When the variability is small, the printer 1 is more likely to detect amounts of positional deviation with the same level of precision using a smaller number of mark sets than when the variability is large. In this way, the printer 1 can conserve toner used for forming the marks 101 without losing precision in measuring amounts of positional deviation. Since the marks 101 are unlikely to deviate in the main scanning direction when variability is small, the marks 101 are not likely to be formed outside the measuring range of the optical sensor 70 in the main scanning direction, even when the marks 101 are formed with a smaller dimension in the main scanning direction. Accordingly, the printer 1 can conserve toner without risk of the marks 101 being formed outside the measuring range of the optical sensor 70.

If the variability is greater than the threshold value T2, the printer 1 increases the number of marks 101 constituting the offset correction pattern 100 to be formed the next time from the number used this time and/or increases the length of the marks 101 in the main scanning direction from the current length. Thus, by using more marks 101 when variability is large than when variability is small, the printer 1 can detect amounts of positional deviation while suppressing the effects of variation. Further, by using marks 101 that are longer in the main scanning direction when variability is large than when variability is small, the printer 1 can reduce the likelihood that marks 101 will be formed outside the measuring range of the optical sensor 70.

Second Embodiment

Next, a printer 201 according to a second embodiment will be described with reference to FIG. 9. The printer 201 has the configuration same as the printer 1 according to the first embodiment except for the following points. In the first embodiment described above, differences in the measurement environments of the optical sensors 70 are reflected in weighting by using the variability of values as weights. In the second embodiment, the distance from the position on the conveying belt 35 at which the optical sensor 70 performs measurements and the nearest positioning part to the measuring position is treated as the measurement environment of that optical sensor 70, and this distance is reflected in weighting. The position on the conveying belt 35 at which the optical sensor 70 performs measurements is an example of a first position on the circular belt. The first position is a closest position to a sensor within an area in which the sensor is configured to read.

The locations of the positioning parts according to the second embodiment will be described with reference to FIG. 9. As in the first embodiment described above, the support member 31 is fixed in position relative to the sub scanning direction by positioning parts 1010a, 1010b, and 1010c provided at three locations 110a, 110b, and 110c on the left side of the support member 31. In the second embodiment, the support member 31 is also fixed in position in the sub scanning direction by positioning parts 1010d, and 1010e provided at two locations 110d and 110e on the right side.

Figure 9:
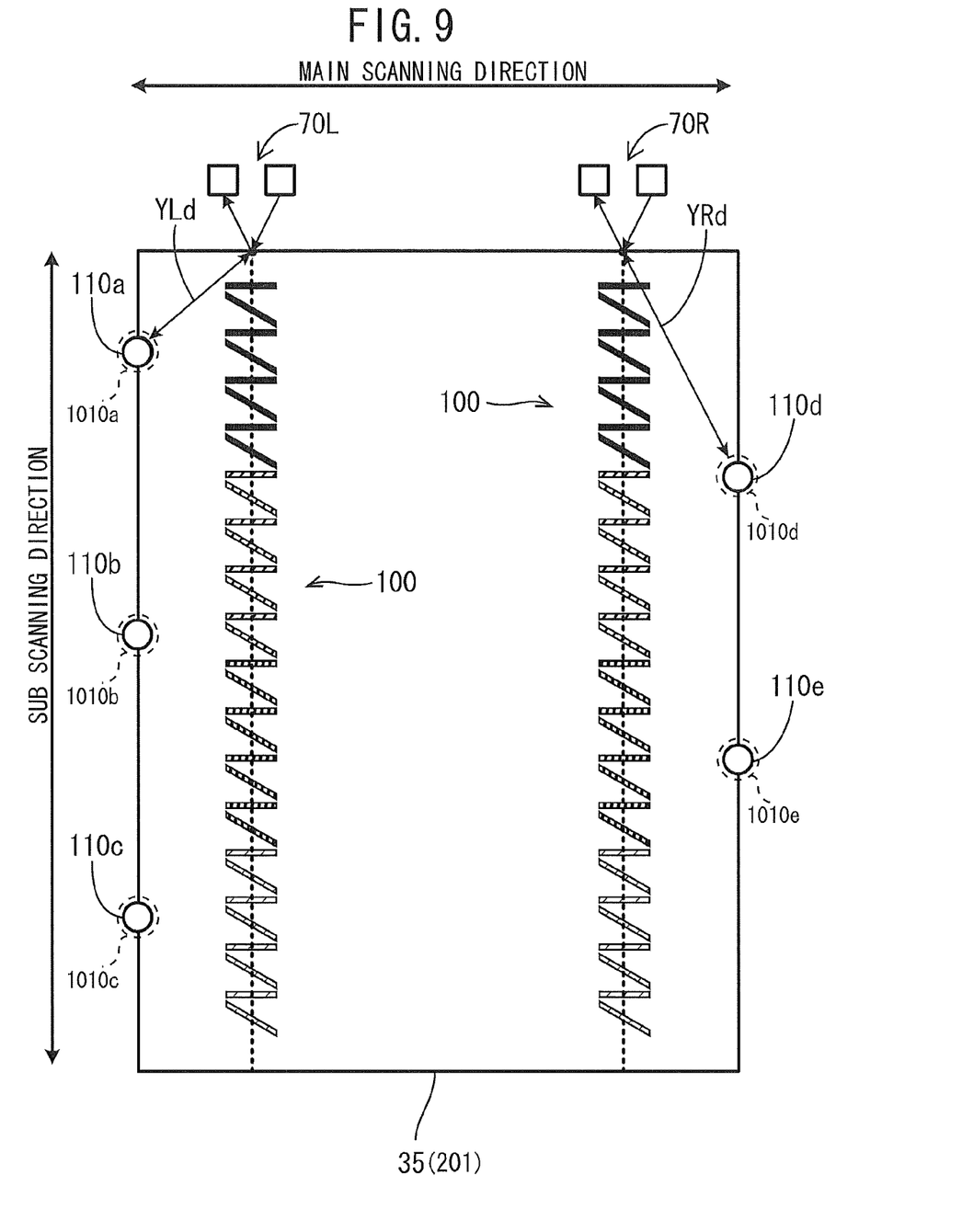
FIG. 9 is an explanatory diagram showing a correction of positional offset performed by an image-forming apparatus according to a second embodiment of the present invention.

In the example of FIG. 9, the positioning part at location 110a is the nearest positioning part to the measuring position of the left optical sensor 70L. On the other hand, the positioning part at location 110d is the nearest positioning part to the measuring position of the right optical sensor 70R.

In this case, the measurement environment of the left optical sensor 70L is considered a distance YLd between location 110a and the measuring position of the left optical sensor 70L, while the measurement environment of the right optical sensor 70R is considered a distance YRd between location 110d and the measuring position of the right optical sensor 70R. Here, the distance between the measuring position of the optical sensor 70 and the nearest positioning part of the support member 31 is used as the measurement environment because, just as in the first embodiment, differences in distances from measuring positions of optical sensors 70 and the nearest positioning parts produce differences in the variability of amounts of positional deviation.

Here, the distance from the position on the conveying belt 35 at which the optical sensor 70 measures marks and the nearest positioning part to this measuring position is pre-measured for each optical sensor 70 by the manufacturer of the printer 1 and stored in the ROM 80b as a fixed value.

Next, the control unit 80 calculates the weighted average using the distances stored in the ROM 80b for weighting. More specifically, the CPU 80a calculates the weighted average value V using Equation 2 below.

$$V = \frac{YRd}{YLd + YRd} \times YL + \frac{YLd}{YLd + YRd} \times YR \qquad \text{Equation 2}$$

Here, using the amounts of positional deviation in the main scanning direction among black marks as an example, YL in the equation 2 denotes the average value of the amount of positional deviation in the main scanning direction detected for each set of black marks by the left optical sensor 70L, YL denotes the distance from the measuring position of the left optical sensor 70L on the conveying belt 35 to the nearest positioning part to this measuring position, YR denotes the average value of the amount of positional deviation in the main scanning direction detected for each set of black marks by the right optical sensor 70R, and YRd denotes the distance from the measuring position of the right optical sensor 70R on the conveying belt 35 to the nearest positioning part to this measuring position.

(1) Process for Correcting Positional Deviation

The process for correcting positional deviation according to the second embodiment is essentially the same as the process described in the first embodiment, except that Equation 2 is used in place of Equation 1 and step S107 is omitted. S107 is not executed because this step involves a process using variability, but variability is not used in the second embodiment.

(2) Process for Detecting Positional Deviation on the Left Side

The process for detecting positional deviation on the left side according to the second embodiment is essentially identical to the process described in the first embodiment, except that steps S204 and S209 are omitted. S204 and S209 are not executed because these steps involve a process for calculating variability, but variability is not used in the second embodiment.

The process for detecting positional deviation on the right side according to the second embodiment is similar to the process performed for the left side.

(3) Effects of the Second Embodiment

With the printer 201 according to the second embodiment described above, the distance from the measuring position of each optical sensor 70 to the closest positioning part of the support member 31 is treated as the measurement environment for that optical sensor 70, and a weighted average of the measured values is calculated using weights that reflect the differences in these distances. Measurement precision of the sensor is affected by the distance between the positioning units and the initial position on the conveying belt 35 at which the sensor 70 measures. This is because the sensor 70 measures marks 101 in a region of the belt where vibrations or more easily controlled when the distance between the measuring position and the positioning units is small and measures marks 101 in a region more susceptible to vibrations when the distance is large. Hence, the distance to the positioning units can be considered the measurement environment of the sensor.

Accordingly, the printer 201 according to the second embodiment can correct the image-forming positions of the image-forming unit 40 while accounting for differences in the measurement environments of the optical sensors 70.

Further, when the printer 201 includes the left optical sensor 70L and right optical sensor 70R, the distances between the measuring positions of these sensors and the nearest positioning parts are incorporated in weighting using Equation 2.

Variations of the Embodiments

While the invention has been described in detail with reference to specific embodiments thereof, it would be apparent to those skilled in the art that many modifications and variations may be made therein without departing from the spirit of the invention, the scope of which is defined by the attached claims.

(1) In the first embodiment described above, the CPU 80a increases the number of sets and/or the lengths of the marks 101 to be used the next time marks are formed from the settings used in the current process, even when the variability is greater than or equal to the threshold value T1, provided that the variability is no greater than the threshold value T2. However, the CPU 80a may instead increase the set number and or length of the marks 101 for the next process irrespective of the threshold value T2, provided that the variability is greater than or equal to the threshold value T1.

Further, the size and number of sets of marks 101 may instead be kept constant irrespective of variability.

(2) In the examples of the first and second embodiments, two optical sensors 70 serve as the plurality of sensors, but three or more optical sensors 70 may be used instead.

(3) In the first embodiment described above, the variability of measured values is calculated for each sensor each time the process for correcting positional deviation is executed. However, the manufacturer of the printer 1 may calculate the variabilities in advance through experiments and store these variabilities in the ROM 80b as fixed values. Thus, even though variabilities differ between the left optical sensor 70L and right optical sensor 70R, the respective optical sensors 70 in the same model of printer 1 can be expected to have approximately uniform variabilities in measured values with little fluctuation.

(4) In the second embodiment, the distance from the position on the conveying belt 35 at which the optical sensor 70 measures to the positioning part nearest that measuring position is described as an example of the environment for that optical sensor 70. However, the measurement environment is not limited to distance, but may be any factor that influences variability in the amounts of positional deviation detected by the optical sensor 70.

(5) While amounts of positional deviation are used as an example of measured values in the first and second embodiments described above, amounts of density deviation may be measured in addition to or instead of amounts of positional deviation when the measurement environments of the optical sensors 70 produce differences in the variability of amounts of density deviation.

(6) In the first and second embodiments, weighting that reflects differences in the measurement environments of individual optical sensors 70 is used. However, weighting is not limited to values reflecting differences in measurement environments.

For example, if optical sensors 70 produce different variabilities in their measured values due to their individual properties rather than differences in the measurement environment, the manufacturer of the printer 1 may calculates the variability in amounts of positional deviation for each optical sensor 70 through experiments performed in advance, and store these values of variability in the ROM 80b as fixed values. The printer may then use these values to calculate the weighted average value. Alternatively, the printer may calculate the variabilities of previous measurements each time the offset correction patterns 100 are formed, as described in the first embodiment.

In addition, the optical sensors 70 could be produced by different manufacturers. As an example, let us say that an optical sensor 70 produced by Company A is known to have variations in measured values within the range±10%, while an optical sensor 70 manufactured by Company B is known to have variations in measured values within the range±5% for the same measurement environment. In this case, the range of variations for Company A's optical sensor 70 is 20% (+10% to −10%), while the range of variations for Company B's optical sensor 70 is 10% (+5% to −5%), indicating that Company A's optical sensor 70 has lower reliability. Therefore, the weight for values measured by Company A's optical sensor 70 may be set to ⅓ (10/(20+10)), and the weight for values measured by Company B's optical sensor 70 may be set to ⅔ (20/(20+10)).

(7) The first embodiment describes an example of using variabilities in measured values as weights for calculating a weighted average when only the left side of the support member 31 is fixed in position relative to the sub scanning direction. However, the distances between the measuring positions of the optical sensors 70 and their nearest positioning part may be used as weights, as described in the second embodiment, when only the left side is fixed in position relative to the sub scanning direction. Conversely, variabilities of measured values may be used as weights in the example of the second embodiment.

(8) While a direct transfer tandem printer is used as an example of the image-forming device in the first and second embodiments, the image-forming device of the present invention may instead by an intermediate transfer-type printer employing an intermediate transfer belt. In this case, the intermediate transfer belt is an example of the rotary body.

(9) The image-forming device in the embodiments described above is a standalone printer, but the image-forming device of the present invention may also be a multifunction peripheral equipped with a printing function, image-reading function, facsimile function, and the like.

(10) In the embodiments described above, the CPU 80a functions to execute the various processes. However, the ASIC 80d may be used to execute a portion of these processes. Alternatively, the ASIC 80d may be eliminated from the control unit 80. Further, the control unit 80 may be provided with a plurality of CPUs that share the processing load.

What is claimed is:

1. An image-forming apparatus comprising:
a rotary body;
an image-forming unit configured to perform an image-forming operation;
at least two sensors configured to read an image formed on the rotary body;
a control device configured to:
control the image-forming unit to form a test image on the rotary body;
control the at least two sensors to read the test image formed on the rotary body to acquire at least two values, each of the at least two values being determined based on a read image acquired by reading the test image with a corresponding one of the at least two sensors;
calculate a weighted average value of the at least two values by using weightings that are assigned to the at least two values, respectively, one of the weightings being different from another one of the weightings; and
correct the image-forming operation using the weighted average value.

2. The image-forming apparatus according to claim 1, wherein the weightings reflect a difference in environments in which the at least two sensors reads the test image.

3. The image-forming apparatus according to claim 2, wherein the rotary body is configured to rotate in a rotational direction, and
wherein the control device is configured to:
control the image-forming unit to form, as the test image, a correction pattern on the rotary body, the correction pattern including a plurality of marks that are arranged in the rotational direction;
control each of the at least two sensors to read the plurality of marks formed on the rotary body to acquire a plurality of values, each of the plurality of values being determined based on a read image that is acquired by reading a corresponding one of the plurality of marks with the each of the at least two sensors; and
calculate the weighted average value by:
calculating, for each of the at least two sensors, an average value of the plurality of values;
calculating, for each of the at least two sensors, a degree of variation in the plurality of values; and
calculating the weighted average value of average values calculated for the at least two sensors by using the weightings that reflect the degrees of variation calculated for the at least two sensors.

4. The image-forming apparatus according to claim 3, wherein the at least two sensors includes a first sensor and a second sensor,
wherein the weighted average value is calculated by using the following equation, $$V = \frac{XRd}{XLd + XRd} \times XL + \frac{XLd}{XLd + XRd} \times XR,$$

and
wherein XL denotes the average value calculated for the first sensor; XR denotes the average value calculated for the second sensor; XLd denotes the degree of variation calculated for the first sensor; and XRd denotes the degree of variation calculated for the second sensor.

5. The image-forming apparatus according to claim 2, wherein the rotary body is configured to rotate in a rotational direction,
wherein the control device is configured to:
control the image-forming unit to form, for each of the at least two sensors, a correction pattern on the rotary body based on a predetermined condition, the correction pattern including a plurality of marks that are arranged in the rotational direction;
control each of the at least two sensors to read the plurality of marks included in the correction pattern corresponding to the each of the at least two sensors to acquire a plurality of values, each of the plurality of values being determined based on a read image that is acquired by reading a corresponding one of the plurality of marks with the each of the at least two sensors;
calculate the weighted average value by:
calculating, for each of the at least two sensors, an average value of the plurality of values;
calculating, for each of the at least two sensors, a degree of variation in the plurality of values; and
calculating the weighted average value of the average values for the at least two sensors by using the weightings that reflect the degrees of variation for the at least two sensors;
determine whether or not the degree of variation for each of the at least two sensors is less than a first threshold value; and
set, if the degree of variation for each of the at least two sensors is less than the first threshold value, a formation-condition for subsequently forming a correction pattern to be read by the each of the at least two sensors to a condition that is determined by performing at least one of:
setting a number of marks included in the correction pattern to be subsequently formed to a number less than a number of the plurality of marks included in the correction pattern that has been formed on the rotary body; and setting a size of marks included in the correction pattern to be subsequently formed to a size smaller than a size of the plurality of marks included in the correction pattern that has been formed on the rotary body.

6. The image-forming apparatus according to claim 5, wherein the control device is further configured to set the formation-condition to another condition if the degree of variation for each of the at least two sensors is greater than or equal to the first threshold value, the other condition being determined by performing at least one of:

setting the number of marks included in the correction pattern to be subsequently formed to a number greater than the number of the plurality of marks included in the correction pattern that has been formed on the rotary body; and setting the size of marks included in the correction pattern to be subsequently-formed to a size larger than the size of the plurality of marks included in the correction pattern that has been formed on the rotary body.

7. The image forming apparatus according to claim 2, wherein the rotary body is a circular belt, wherein image forming apparatus further includes a housing having a positioning part for positioning the circular belt relative to the housing, and wherein the weighted average value is calculated by using the weightings that reflect the difference in environments in which the at least two sensors reads the test image, an environment in which each of the at least two sensors reads the test image being a distance between: a first position on the circular belt that is a closest position to the each of the at least two sensor within an area in which the each of the at least two sensors is configured to read; and a second position on the circular belt corresponding to the positioning part.

8. The image forming apparatus according to claim 7, wherein the at least two sensors includes a first sensor and a second sensor, the at least two values including one value and another value, the one value being determined based on a read image acquired by reading the test image with the first sensor, the other value being determined based on a read image acquired by reading the test image with the second sensor, wherein the weighted average value is calculated by using the following Equation, $$V = \frac{XRd}{XLd + XRd} \times XL + \frac{XLd}{XLd + XRd} \times XR,$$

and wherein YL denotes the one value, YR denotes the another value, YLd denotes a distance between the first position of the first sensor and the second position of the first sensor, and YRd denotes a distance between the first position of the second sensor and the second position of the second sensor.

9. A method comprising:

controlling an image-forming unit of an image-forming apparatus to form a test image on a rotary body of the image-forming apparatus;

controlling at least two sensors of the image-forming apparatus to read the test image formed on a rotary body of the image-forming apparatus to acquire at least two values, each of the at least two values being determined based on a read image acquired by reading the test image with corresponding one of the at least two sensors;

calculating a weighted average value of the at least two values by using weightings that are assigned to the at least two values, respectively, one of the weightings being different from another one of the weightings; and correcting an image-forming operation of the image-forming apparatus using the weighted average value.

10. A non-transitory computer readable storage medium storing a set of program instructions executed by a computer, the program instructions comprising:

controlling an image-forming unit of an image-forming apparatus to form a test image on a rotary body of the image-forming apparatus;

controlling at least two sensors of the image-forming apparatus to read the test image formed on the rotary body to acquire at least two values, each of the at least two values being determined based on a read image acquired by reading the test image with corresponding one of the at least two sensors;

calculating a weighted average value of the at least two values by using weightings that are assigned to the at least two values, respectively, one of the weightings being different from another one of the weightings; and correcting an image-forming operation of the image-forming apparatus using the weighted average value.

* * * * *